United States Patent
Yumita

(10) Patent No.: US 6,876,100 B2
(45) Date of Patent: Apr. 5, 2005

(54) SMALL POWER GENERATING DEVICE AND WATER FAUCET DEVICE

(75) Inventor: Yukinobu Yumita, Nagano (JP)

(73) Assignees: Kabushiki Kaisha Sankyo Seiki Seisakusho, Nagano (JP); Toto Ltd., Fukuoka (JP)

( * ) Notice: Subject to any disclaimer, the term of this patent is extended or adjusted under 35 U.S.C. 154(b) by 288 days.

(21) Appl. No.: 10/276,265

(22) PCT Filed: May 16, 2001

(86) PCT No.: PCT/JP01/04079

§ 371 (c)(1),
(2), (4) Date: Nov. 14, 2002

(87) PCT Pub. No.: WO01/89066

PCT Pub. Date: Nov. 22, 2001

(65) Prior Publication Data

US 2003/0164612 A1 Sep. 4, 2003

(30) Foreign Application Priority Data

May 17, 2000 (JP) .................................. 2000-144546

(51) Int. Cl.⁷ ............................................. H02P 9/04
(52) U.S. Cl. ............................. 290/54; 290/52; 290/43
(58) Field of Search .............................. 290/43, 52, 54

(56) References Cited

U.S. PATENT DOCUMENTS

| 4,276,482 A | | 6/1981 | Crockett ........................ 290/52 |
| 4,511,806 A | * | 4/1985 | May ............................. 290/43 |
| 4,731,545 A | * | 3/1988 | Lerner et al. .................. 290/54 |
| 4,740,711 A | * | 4/1988 | Sato et al. ..................... 290/52 |
| 4,886,207 A | | 12/1989 | Lee et al. ................. 236/12.12 |
| 4,963,780 A | | 10/1990 | Hochstrasser ............... 310/104 |
| 5,349,985 A | | 9/1994 | Fischer ........................ 137/607 |
| 5,659,205 A | * | 8/1997 | Weisser ....................... 290/52 |
| 6,441,508 B1 | * | 8/2002 | Hylton ........................ 290/52 |
| 6,512,305 B1 | * | 1/2003 | Pinkerton et al. ............. 290/52 |

FOREIGN PATENT DOCUMENTS

| DE | 44 25 294 A1 | 2/1996 |
| EP | 0 384 006 A1 | 11/1989 |
| EP | 0 484 249 A2 | 5/1992 |
| JP | 3-98445 A | 4/1991 |
| JP | 4-231 A | 1/1992 |
| JP | 4-8869 A | 1/1992 |
| JP | 6-165468 A | 6/1994 |
| JP | 3003308 U | 8/1994 |
| JP | 2513745 | 7/1996 |
| JP | 9-273646 A | 10/1997 |
| JP | 10-26243 A | 1/1998 |
| JP | 11-152772 A | 6/1999 |

* cited by examiner

Primary Examiner—Nicholas Ponomarenko
(74) Attorney, Agent, or Firm—Sughrue Mion, PLLC

(57) ABSTRACT

A small generator includes a hydraulic turbine provided in a fluid path rotating with a passage of a fluid in a predetermined flow and a rotator coupled to the hydraulic turbine rotating together with the hydraulic turbine which acts as a rotor portion opposed to a stator portion having multiple layers in a stepping motor including the stator portion, wherein the rotor portion relatively rotates with respect to the stator portion with the passage of the fluid, thereby generating a power.

10 Claims, 7 Drawing Sheets

SMALL POWER GENERATING DEVICE AND WATER FAUCET DEVICE

BACKGROUND OF INVENTION

1. Field of Invention

The present invention relates to a small generator utilizing a hydroelectric generated by a water flow passing through a faucet and a Water tap apparatus contains a small generator is provided.

2. Related Art

Conventionally, there is widely provided an automatic Water Tap apparatus contains a sensor sensing that a hand held out beneath a faucet. Then the faucet starts to flow water from is on the basis of the sensor sensing. In recent years, moreover, there is proposed an apparatus such that a small generator is provided in a fluid path of such an automatic Water Tap apparatus and a power generated by the small generator is storaged to complement for the power consumption of a circuit such as the sensor as shown in Japanese Utility Model Publication Hei. 2-65775.

The structure of the small generator will be briefly described below. A hydraulic turbine is provided in a fluid path to be a water flowing path and rotates by receiving the hydroelectric of flowing water. A rotor is fixed integrally with the rotary shaft of the hydraulic turbine. The outer peripheral surface of the rotor is a magnetized as a rotor magnet. The rotor magnet is opposed to a stator pole through the wall of a non-magnetic member. Moreover, single layer stator coil is provided to be interlinked with a magnetic flux passing through the stator pole. Then, the hydraulic turbine rotates by receiving the hydroelectric of the flowing water so that a magnet rotates relatively with respect to the stator pole. Therefore, the flow of the magnetic flux flowing to the rotor and the stator pole is changed. As a result, a current flows to the stator coil in such a direction as to prevent the change in the flow of the magnetic flux. After the current is rectified, it is stored in a storage battery.

As described above, the magnetic flux flows between the rotor and the stator pole in the generator. The magnetic flux acts as a resistance when the hydraulic turbine is to be rotated by the hydroelectric caused by flowing the water. In other words, a magnetic flux generated between the rotor and the stator pole acts as a detent torque to brake the operation of the hydraulic turbine during the starting and rotation of the hydraulic turbine. Accordingly, in order to rotate the hydraulic turbine, it should receive a flow amount and a hydraulic pressure beyond a predetermined value. Therefore, if the flow amount is small or the hydraulic pressure of the flowing water received by the hydraulic turbine is low, the hydraulic turbine is neither rotated nor generates a power. If the magnetic force of the rotor magnet is low, the detent torque is reduced so that the hydraulic turbine itself is rotated Consequently, an induced voltage generated during the rotation of the rotor is also dropped so that the amount of power generation is extremely increased. In order to obtain a desirable amount of power generation, it is necessary to increase the magnetic force of the rotor magnetic to some extent and to maintain the flow and hydraulic pressure of a fluid for rotating the hydraulic turbine to some extent.

Under such circumstances, in the small generator for the automatic Water Tap apparatus which has been used widely, if the flow is specifically set to 3 liters/minute or less, the detent torque acts as a resistance so that the hydraulic turbine cannot be smoothly rotated. In order to rotate the hydraulic turbine, it is necessary to set the flow more than 3 liters/minute.

Water saving has been demanded for a long time in respect of the improvement of the environment and other various problems. Under such circumstances, there has been a problem in that the amount of water to flow at a time should be reduced as much as possible also in the automatic Water Tap apparatus. In addition, in the present situations in which a user's critical mind for water saving has been enhanced, the hydraulic pressure of the water discharged with the flow should also be reduced. It is necessary to give such an image that the water saving is being carried out through a drop in the hydraulic pressure.

SUMMARY OF INVENTION

It is an object of the invention to provide a small generator capable of rotating a water turbine with a small flow to generate a sufficient amount of power and a Water Tap apparatus.

In consideration of the above-mentioned problems, according to an aspect to the present invention there is provided a small generator comprising a hydraulic turbine, provided in a fluid path, rotating by passing a fluid in a predetermined flow rate, a rotator, coupled to the hydraulic turbine, rotating together with the hydraulic turbine, the rotator acting as a rotor portion opposed to a stator portion having multiple layers in a stepping motor including the stator portion, wherein the rotor portion rotates relatively with respect to the stator portion by with passing the fluid to generate a power. Thus, the stator portion of the stepping motor for power generation is constituted by multiple of layers. Therefore, each layer acts to cancel a detent torque between the stator portion and the rotor so that the detent torque can be reduced. As a result, the hydraulic turbine can rotate with a small flow at a low hydraulic pressure.

According to another aspect of the present invention, in addition to the aspect of the present invention described above, a detent torque generated between the stator portion and the rotor is set to be cancelled by the layers each other. For example, the detent torque is positively set to be reduced by skewing each layer (rotating the layer in a circumferential direction to intentionally shift a pole thereof) or providing a non-magnetic member between the layers. Consequently, the functions can be obtained more effectively.

Moreover, according to another aspect of the present invention, there is provided a small generator comprising a hydraulic turbine, provided in a fluid path, rotating by passing a fluid in a predetermined flow rate, a rotator, coupled to the hydraulic turbine, rotating together with the hydraulic turbine, the rotator acting as a rotor portion opposed to a stator portion having a plurality of coil portions in a brushless motor including the stator portion, wherein the rotor portion rotates relatively with respect to the stator portion by passing the fluid to generate a power. Thus, the rotator coupled to the hydraulic turbine serves as the rotor portion opposed to the stator portion of the brushless motor. Therefore, it is possible to reduce the detent torque than that in a conventional generator of a conventional single layer type stepping motor. As a result, it is possible to rotate the hydraulic turbine with a small flow at a low hydraulic pressure.

According to another aspect of the present invention, in addition to the aspect to the present invention described above, a relationship between the number of poles magnetized onto the rotor portion and the number of coil portions of the stator portion is set to 2-3, 4-3 or 4-6. Consequently, it is possible to further reduce the detent torque between the stator portion and the rotor portion.

According to another aspect of the present invention, in addition to the aspect of the present invention, there is provided an injecting member including an injecting hole which acts as a part of the fluid path and acts to throttle a flow for a passage to inject a fluid onto a blade portion of the hydraulic turbine. Consequently, it is possible to raise a hydraulic pressure to some extent through the injecting hole even if the flow is small. Therefore, it is possible to rotate the hydraulic turbine more smoothly, thereby generating a power. Moreover, each of the small generators can generate a power with a small flow at a low pressure by reducing the detent torque. Therefore, it is also possible to generate a power without greatly raising the hydraulic pressure through an increase in the diameter of the injecting hole. In the case in which such setting is carried out, it is possible to reduce a possibility that the injecting member might be damaged due to a high hydraulic pressure.

Furthermore, according to another aspect of the present invention, there is provided a Water Tap apparatus wherein a valve opening degree is controlled to include at least two modes of a water saving mode in which a flow of a fluid to flow to a fluid path and a normal mode for a normal flow and the small generator of the present invention described in claims 6 to 9 is provided in the fluid path. As described above, the detent torque is reduced in the small generator according to the present invention described in claims 6 to 9 which is provided in the fluid path. Therefore, it is possible to generate a power with a small flow at a low hydraulic pressure. Therefore, if the hydraulic pressure of the fluid to be supplied to the hydraulic turbine is set to be low, it is possible to reduce a possibility that the member might be damaged due to a high hydraulic pressure in the normal mode and to sufficiently generate a power also in the water saving mode.

According to a seventh aspect of the present invention, in addition to the sixth aspect of the present invention, the flow in the water saving mode is set to 2.0 liters/minute to 3.0 liters/minute. Therefore, the water saving can fully be carried out and the power can be generated in a small amount of water.

BRIEF DESCRIPTION OF DRAWINGS

FIG. 7($b$) is a front sectional view.

DETAILED DESCRIPTION OF PREFERRED EMBODIMENTS

Each embodiment of a small generator and a Water Tap apparatus according to the invention will be described below in detail with reference to the drawings.

First Embodiment

Figure 1:
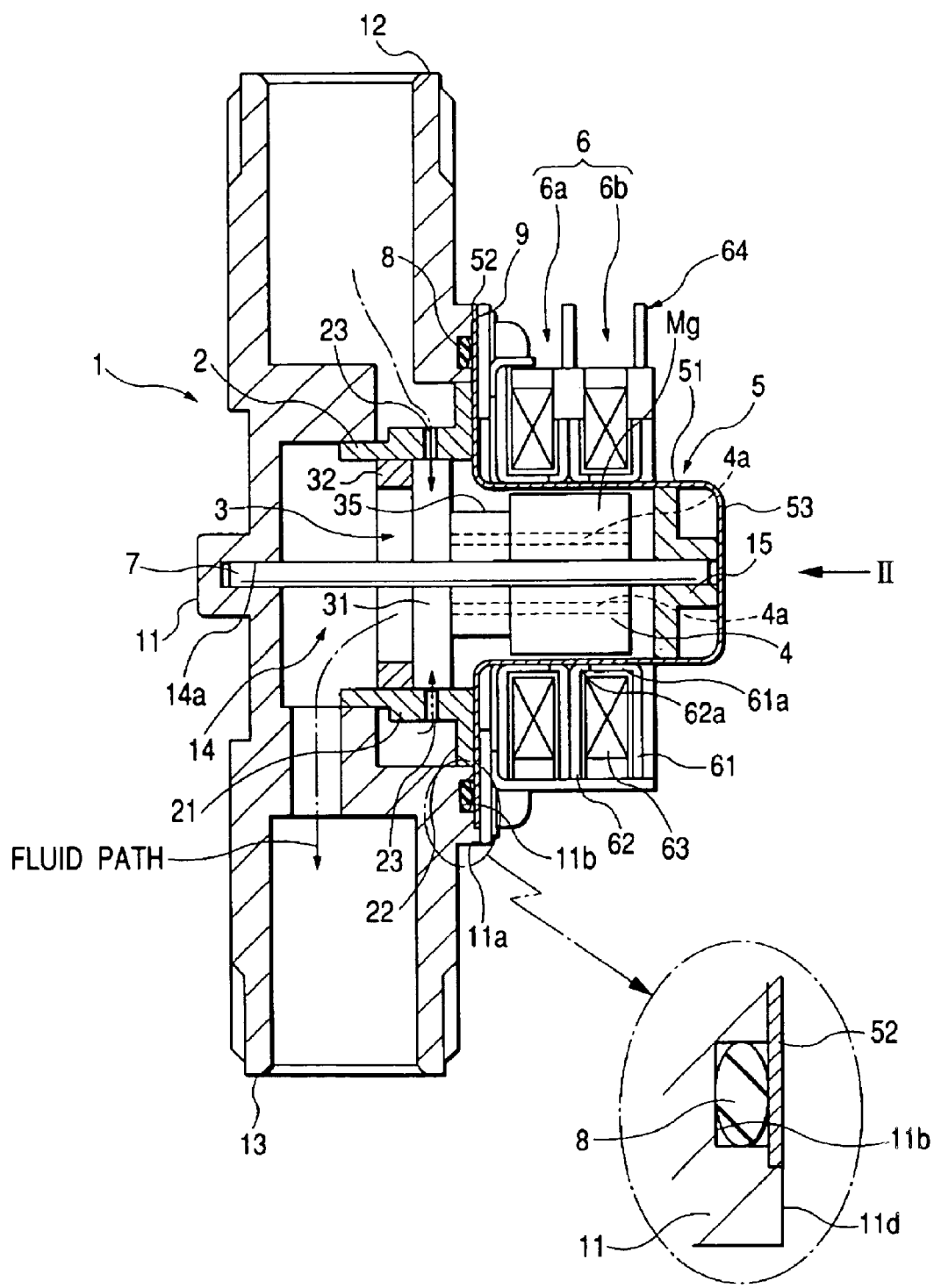
FIG. 1 is a longitudinal sectional view showing a small generator of a two-layer stepping motor type according to a first embodiment of the invention.
Figure 2:
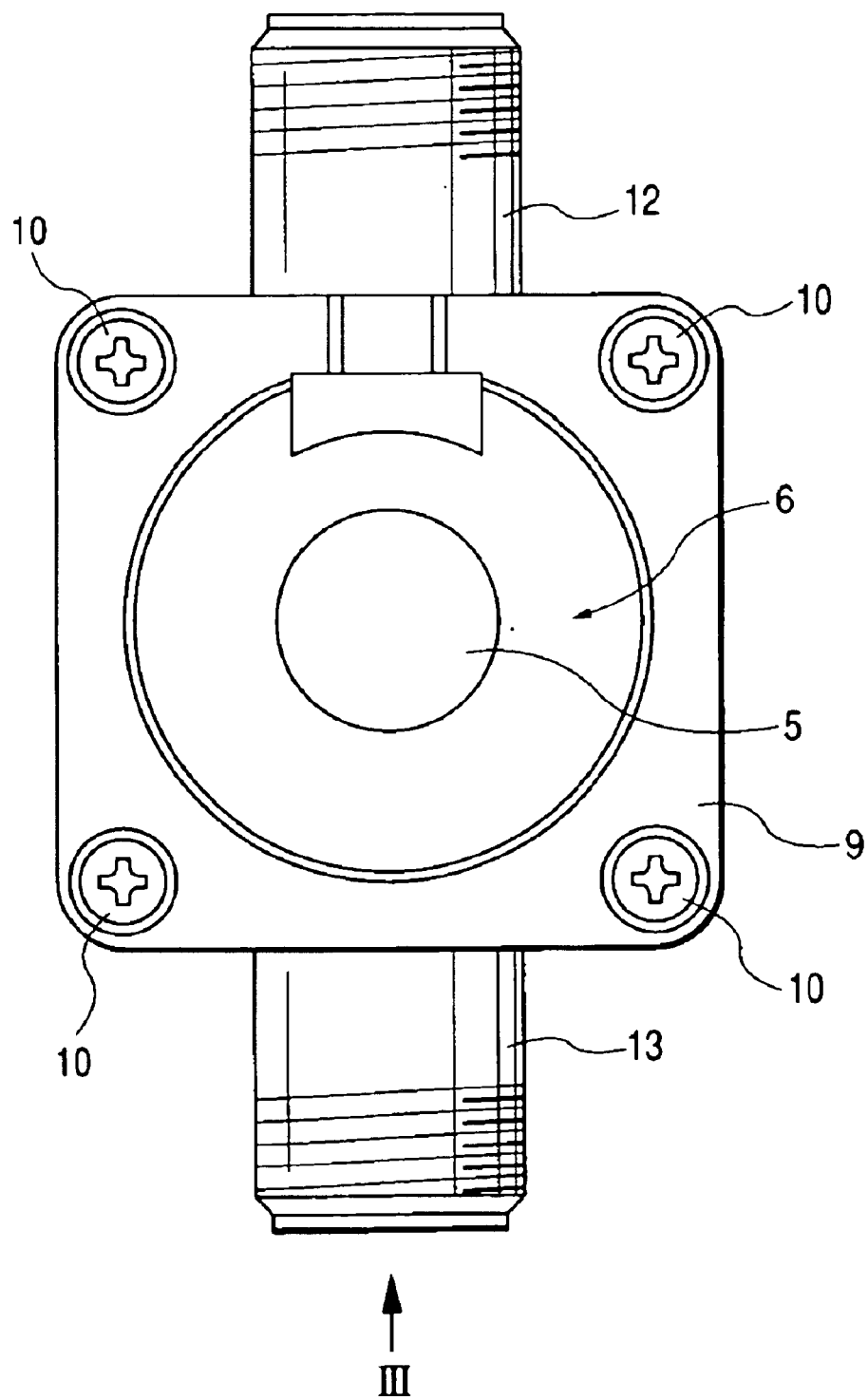
FIG. 2 is a side view showing the small generator of FIG. 1 taken along an arrow II in FIG. 1.
Figure 3:
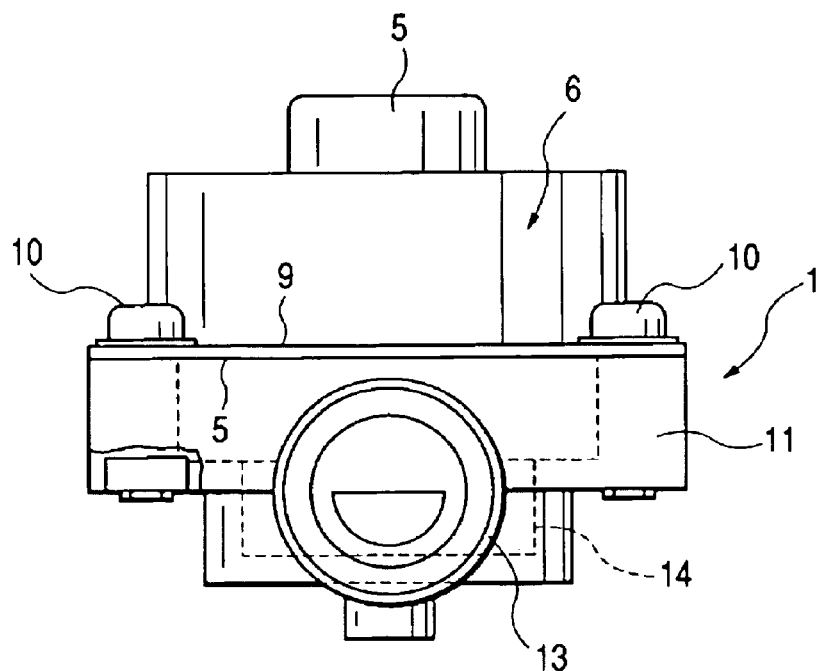
FIG. 3 is a bottom view showing the state of FIG. 2 taken along an arrow III.
Figure 4:
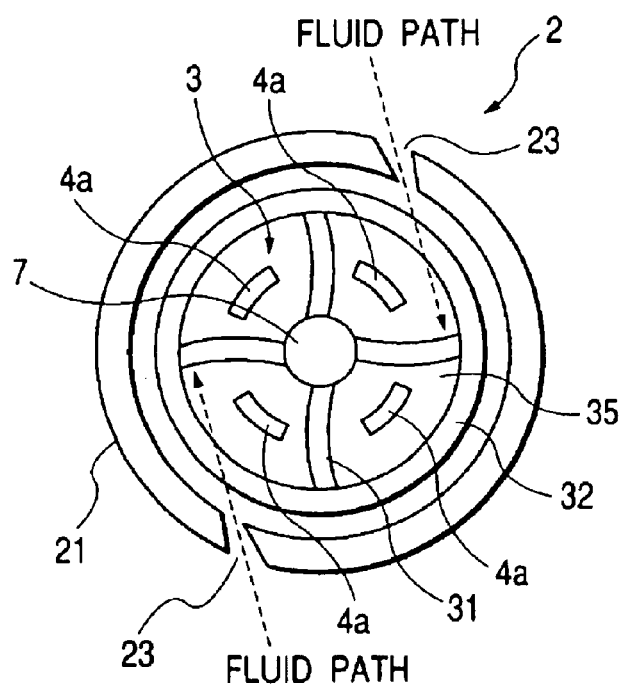
FIG. 4 is a typical view showing the relationship between a member (nozzle ring) for spraying a fluid onto a hydraulic turbine in a state in which a hydraulic pressure is raised by throttling a fluid path and the hydraulic turbine.

Primary, a small generator utilizing a two-layer stepping motor type according to a first embodiment of the invention will be described with reference to FIGS. 1 to 4. FIG. 1 is a longitudinal sectional view showing a small generator of a two-layer stepping motor type according to the first embodiment of the invention. Moreover, FIG. 2 is a side view showing the small generator of FIG. 1 taken along an arrow II in FIG. 1. Furthermore, FIG. 3 is a bottom view showing the state of FIG. 2 taken along an arrow III. Moreover, FIG. 4 is a typical view showing a relationship between a member (nozzle ring) for spraying a fluid onto a hydraulic turbine in a state in which a hydraulic pressure is raised by throttling a fluid path and the hydraulic turbine.

As shown in FIG. 1, the small generator utilizing a two-layer stepping motor type according to the first embodiment comprises a casing 1, a nozzle ring 2 provided in the casing 1, a hydraulic turbine 3 rotatably provided on the inner peripheral side of the nozzle ring 2, a rotor 4 rotating integrally with the hydraulic turbine 3, a cup-shaped member 5 formed of stainless which is provided on the outer peripheral side of the rotor 4, and a stator portion 6 of a stepping motor which is further provided on the outside of the cup-shaped member 5.

As shown in FIGS. 1 and 2, the casing 1 includes a body portion 11, and an inlet path 12 and an outlet path 13 which are protruded toward the outside of the body portion 11. The body portion 11 has a generation part attaching portion 11$a$ for attaching a generation part constituted by the rotor 4 and the stator portion 6. The generation part attaching portion 11$a$ is constituted by an open end face portion formed on the right side of the body portion 11 in FIG. 1 and an outer peripheral portion thereof, and a circumferential groove 11$b$ is formed in the outer peripheral portion. An O ring 8 is embedded in the groove 11$b$.

Furthermore, a flange portion 52 of the cup-shaped member 5 is pushed to seal the O ring 8 in the groove 11$b$ and a cover member 9 is provided to interpose the flange portion 52 of the cup-shaped member 5 together with the generation part attaching portion 11$a$ in a state in which the outer peripheral end of the flange portion 52 is caused to abut on a convex portion 11$d$ formed in the body portion 11 (see the enlarged view of FIG. 1). More specifically, the cup-shaped member 5 is pushed against the generation part attaching portion 11$a$ while crushing the O ring 8 in the groove 11$b$, and furthermore, the cover member 9 covers from above. When the outer peripheral end of the flange portion 52 of the cup-shaped member 5 is thus caused to abut on the inner peripheral part of the convex portion 11$d$, the cup-shaped member 5 is positioned in the inner peripheral part of the stator portion 6. As shown in FIG. 2, four screws 10 are inserted in screw holes formed on four corners of the cover member 9 for screwing so that the cover portion 9 is fixed to the body portion 11 of the casing 1. Consequently, the generation part attaching portion 11$a$ to be the open end face of the casing 1 is closed by the cup-shaped member 5.

The cup-shaped member 5 is formed of a non-magnetic stainless member, and has the flange portion 52, a cylindrical portion 51 and a bottom portion 53 formed through throttling. A bearing 15 for rotatably receiving one of ends of a shaft 7 supporting the hydraulic turbine 3 and the rotor 4 is fitted in the bottom portion 53. The cup-shaped member 5 serves to separate the stator portion 6 of the stepping motor from a fluid passing through the inside of the casing 1 and to prevent the fluid from flowing out of the casing 1.

Figure 7A:
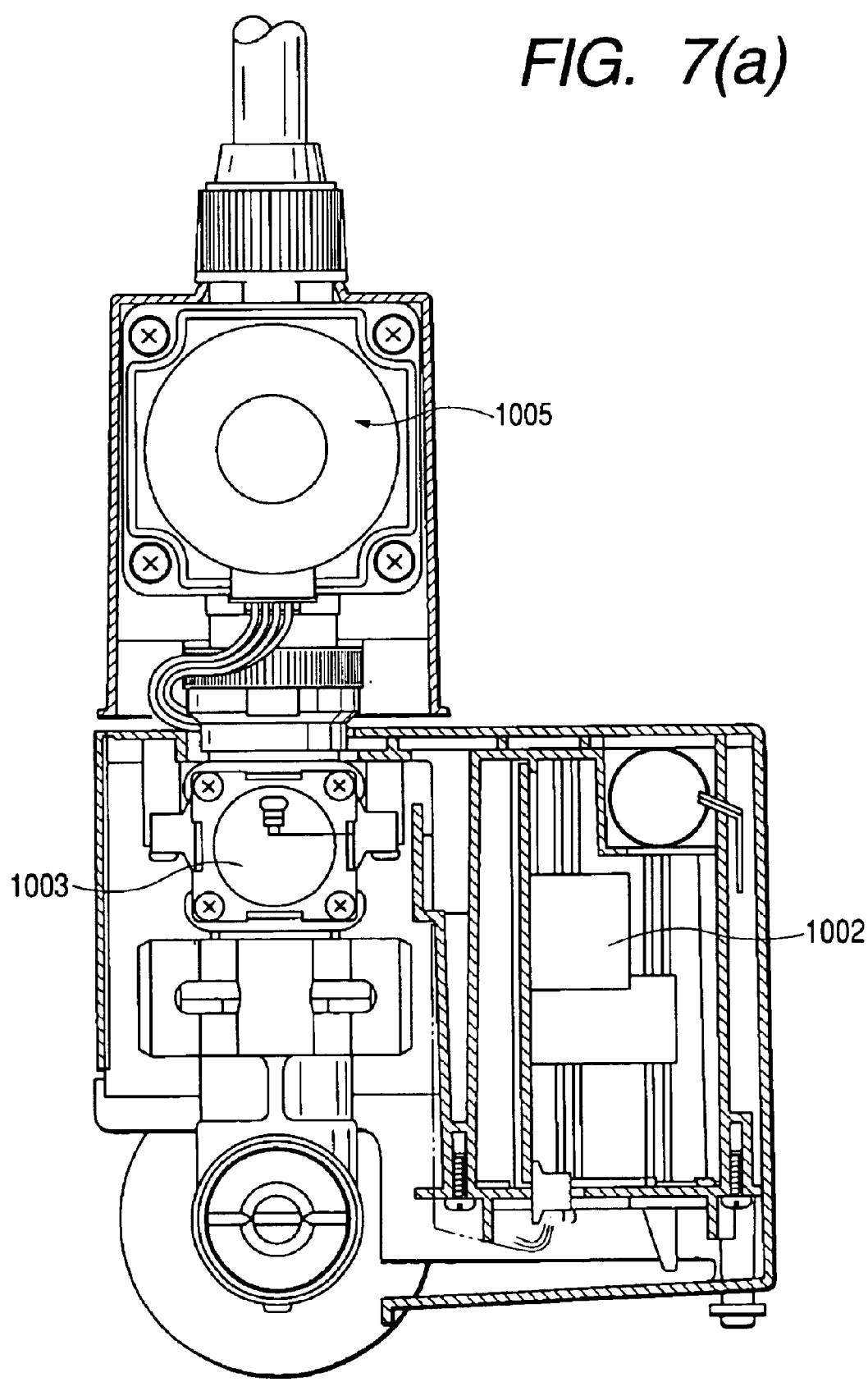
FIG. 7($a$) is a sectional side view of the water tap apparatus containing the small generator of the present invention.
Figure 7B:
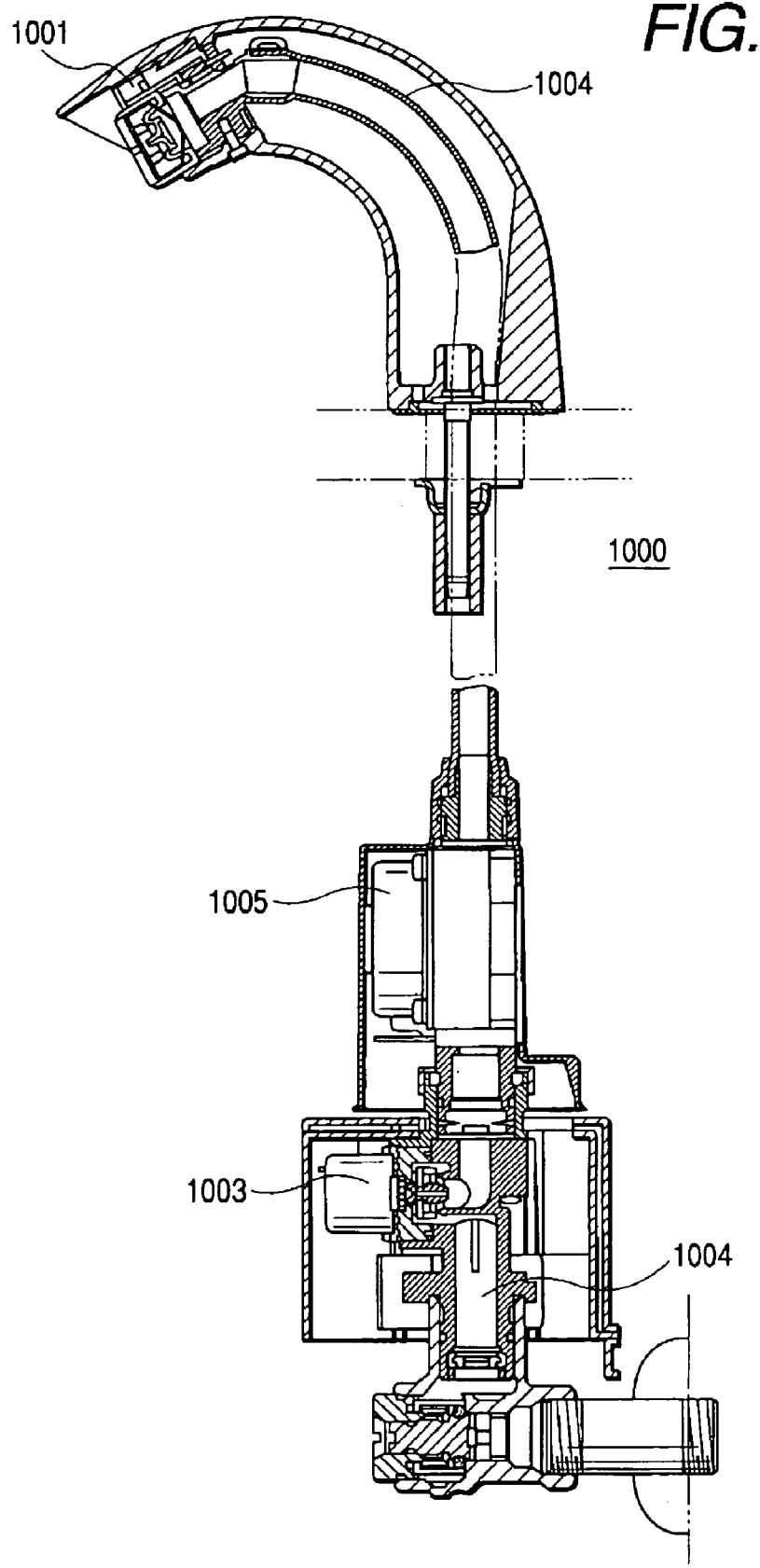

The inlet path 12 and the outlet path 13 which are formed in the casing 1 and a coupling path 14 for coupling them are provided in a part of a fluid path of a Water Tap apparatus (as shown in FIG. 7) constituted by a faucet, a valve and the like, and a fluid entering the inlet path 12 from a fluid source passes through the coupling path 14 and is then discharged from the outlet path 13. The fluid serves to give the rotating force to the hydraulic turbine 3 during the passage. This portion will be described below in detail. The other end of the shaft 7 supporting the rotation of the hydraulic turbine 3 and the rotor 4 which will be described below is rotatably provided in the coupling path 14. One of ends of the shaft 7 is rotatably fitted in a hole 14*a* for a bearing which is formed in the coupling path 14 of the casing 1 and the other end side thereof is rotatably fitted in the bearing 15 having a tip provided in the cup-shaped member 5 through the open end face. Consequently, the shaft 7 is held by cooperate the casing 1 with the cup-shaped member 5.

The nozzle ring 2 to be an injecting member acting as a part of the fluid path of the Water Tap apparatus and serving to throttle the flow of the passing fluid and to inject the fluid to a blade portion 31 (see FIG. 4) of the hydraulic turbine 3 is fitted in the coupling path 14 of the casing 1 by pressure. The nozzle ring 2 has an cylindrical ring portion 21 and a flange portion 22 formed by bending one of open ends of the ring portion 21 in a peripheral direction. Two nozzles 23 are provided in symmetrical positions by approximately 180 degrees in the ring portion 21 as shown in FIG. 4 in such a manner that the two nozzles 23 serve as injecting holes for throttling an inlet passage of the fluid entering the inlet path 12 and for injecting the fluid to the blade portion 31 of the hydraulic turbine 3 disposed on the inside.

The hydraulic turbine 3, provided in the nozzle ring 2 to be a part of the fluid path, rotates with the passage of the fluid in a predetermined flow. The hydraulic turbine 3 includes a cylindrical ring portion 32 and the blade portion 31 having an outer peripheral tip portion connected to one of side end faces of the ring portion 32 and a central portion inserted and fixed to the shaft 7. The blade portion 31 is curved circularly to easily receive the pressure of the fluid from the nozzle 23. For this reason, the fluid which enters the inlet path 12 and is then throttled with the two nozzles 23 to have a pressure raised hits on the blade portion 31 of the hydraulic turbine 3 vigorously and the hydraulic turbine 3 rotates around the shaft 7 by the hydroelectric thereof. The fluid hitting on the blade portion 31 is moved from the coupling path 14 to the outlet path 13 through the open part of the hydraulic turbine 3 and the inner peripheral part of the ring portion 32.

The rotor 4 is formed integrally through the hydraulic turbine 3 and a coupling shaft portion 35 and is provided coaxially with the hydraulic turbine 3. More specifically, the hydraulic turbine 3, the coupling shaft portion 35 and the rotor 4 are coupled in a direction of extension of the shaft 7. Therefore, when the hydraulic turbine 3 rotates by the hydroelectric, the rotor 4 rotates around the shaft 7 integrally with the hydraulic turbine 3. Four communicating holes 4*a* communicating in the direction of extension of the shaft 7 are formed on the coupling portion 35 and the rotor 4 at regular intervals in a circumferential direction. These communicating holes 4*a* serve to give smooth rotation of the shaft 7 with respect to the bearing 15 by causing the fluid to flow into the right side of the rotor 4 in FIG. 1.

The rotor 4 serves as the rotor portion of the stepping motor in such a manner that the rotor 4 is coupled to the hydraulic turbine 3 rotating together with the hydraulic turbine 3, and is constituted by a rotor magnet Mg having eight poles magnetized onto an outer peripheral surface thereof. The outer peripheral surface is opposed to the stator portion 6 of the stepping motor through the cylindrical portion 51 of the cup-shaped member 5. For this reason, in the case in which the rotor 4 rotates together with the hydraulic turbine 3, it rotates relatively with respect to the stator portion 6.

The stator portion 6 is constituted by two layers 6*a* and 6*b* which are superposed in an axial direction. Each of the layers 6*a* and 6*b* includes an outer yoke (provided on the outside in a state of superposition) 61, an outer pole tooth 61*a* formed integrally with the outer yoke 61, an inner yoke (provided on the inside in the state of superposition) 62, an inner pole tooth 62*a* formed integrally with the inner yoke 62, and a coil 63 wound onto a coil bobbin. Start and end portions for winding the coil 63 are connected to a terminal 64, respectively.

The stator portion 6 thus constituted is fitted in the outside part of the cylindrical portion 51 of the cup-shaped member 5. Therefore, a magnetic flux flows between the pole teeth 61*a* and 62*a* of the stator portion 6 and the magnetized portion of the rotor 4. As described, when the rotor 4 rotates together with the hydraulic turbine 3, the flow of the magnetic flux is changed so that an induced voltage is generated on the coil 63 in such a direction as to prevent the change in the flow. The induced voltage is taken out of the terminal 64. The induced voltage lead in such a form is converted into a direct current through a circuit, and the direct current is then rectified through a predetermined circuit (not shown) and is charged into a battery.

A specific flow for rotating the hydraulic turbine 3 will be described below. The rotating force received by the hydraulic turbine 3 is set by the flow and hydraulic pressure of the fluid. In other words, the fluid entering the inlet 12 is throttled by the nozzle 23 to some extent and is caused to vigorously hit on the blade portion 31 of the hydraulic turbine 3. Consequently, the hydraulic turbine 3 receives the rotating force from the fluid. As a matter of course, even if the hydraulic pressure is not raised by throttling the fluid path through the nozzle 23, the hydraulic turbine 3 can rotate with a sufficient flow itself. However, if the fluid is caused to hit on the blade portion 31 of the hydraulic turbine 3 in a state in which the hydraulic pressure is raised by the nozzle 23, it is possible to rotate the hydraulic turbine 3 with a smaller flow.

In the embodiment, the fluid path is throttled to raise the hydraulic pressure. However, if the hydraulic pressure is too raised, there is also a possibility that the blade portion 31 of the hydraulic turbine 3, the nozzle ring 2 and other fluid paths for a fluid might be broken. To the contrary, if the hydraulic pressure is too low, the flow becomes insufficient so that power generation cannot fully be carried out. For this reason, it is necessary to properly set the hydraulic pressure in respect of the materials and thicknesses of the hydraulic turbine 3 and the nozzle ring 2.

In addition to the shape of the blade portion 31 of the hydraulic turbine 3 and the total weight of the hydraulic turbine 3 (including the weight of the rotor 4), a detent torque generated between the rotor 4 and the stator portion 6 acts as a resistance to be opposite to the rotating force. The invention has a main object to reduce a detent torque portion. In the embodiment, the stator portion 6 has a two-layer structure and is skewed (each layer is shifted in a circumferential direction). Consequently, the pole tooth positions are shifted in the circumferential direction, for example, and the detent torques generated between the pole teeth and the magnetized portion of the rotor 4 to be the rotor portion are cancelled from each other. Consequently, the detent torque is reduced. Therefore, the detent torque between the rotor 4 and the stator portion 6 which is generated during the rotation of the hydraulic turbine 3 does not effect as a very strong brake and the hydraulic turbine 3 can rotate smoothly with a small flow at a low hydraulic pressure together with the rotor 4.

In the embodiment, thus, the stator portion 6 of the stepping motor has the two-layer structure and the shape and thickness of the blade portion 31 are set to predetermined dimensions. Consequently, the hydraulic turbine 3 can rotate by utilizing a fluid flowing into the inlet path 12 with 2.0 to 3.0 liters/minute.

In the embodiment, moreover, a minimum starting current amount at which a generator starts to be rotated is set to approximately 1.2 to 1.5 liters/minute. However, the amount of power generation is small. Furthermore, a voltage required for storage in a capacitor which is not shown is at least 5V or more in consideration of a conversion from AC to DC. Although a power can be generated with a slightly smaller flow than 2.0 liters/minute in the embodiment, a flow of 2.0 liters/minute of more is required for actually generating a power reliably.

On the other hand, the flow rate of 2.0 liters/minute is actually used as a minimum flow rate for washing hands. From the foregoing, in the embodiment, a flow rate of 2.0 to 3.0 liters/minute is set to be a water saving mode and a flow rate which is greater than 3.0 liters/minute is set to be a normal mode.

If the stator portion 6 has a single layer structure and other portions are the same as those of the embodiment, the detent torque acts as the brake more strongly than that in the embodiment described above. More specifically, the hydraulic turbine 3 can rotate with a flow rate which is greater than 3 liters/minute.

Second Embodiment

Figure 5:
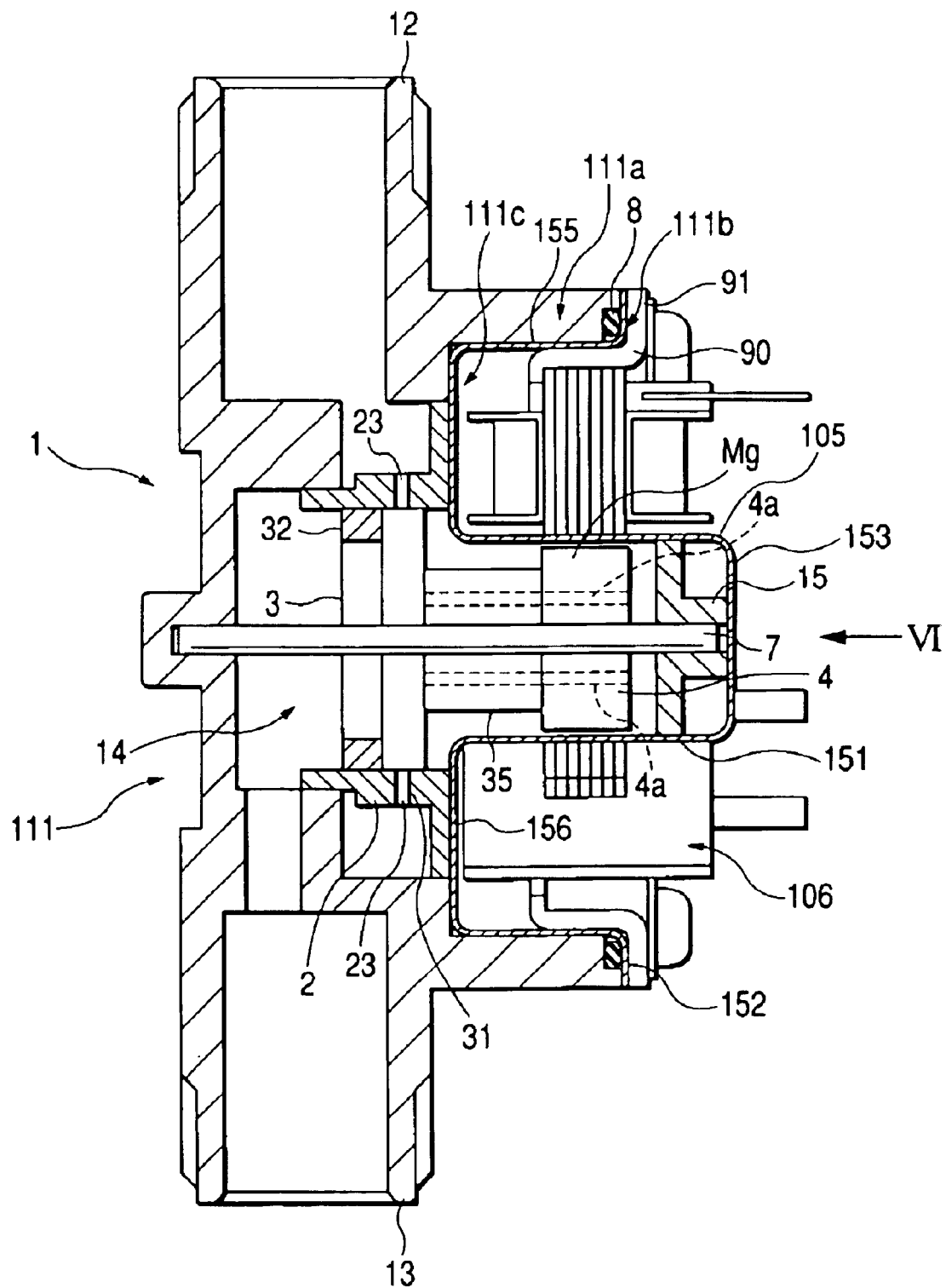
FIG. 5 is a longitudinal sectional view showing a small generator of a brushless motor type according to a second embodiment of the invention.
Figure 6:
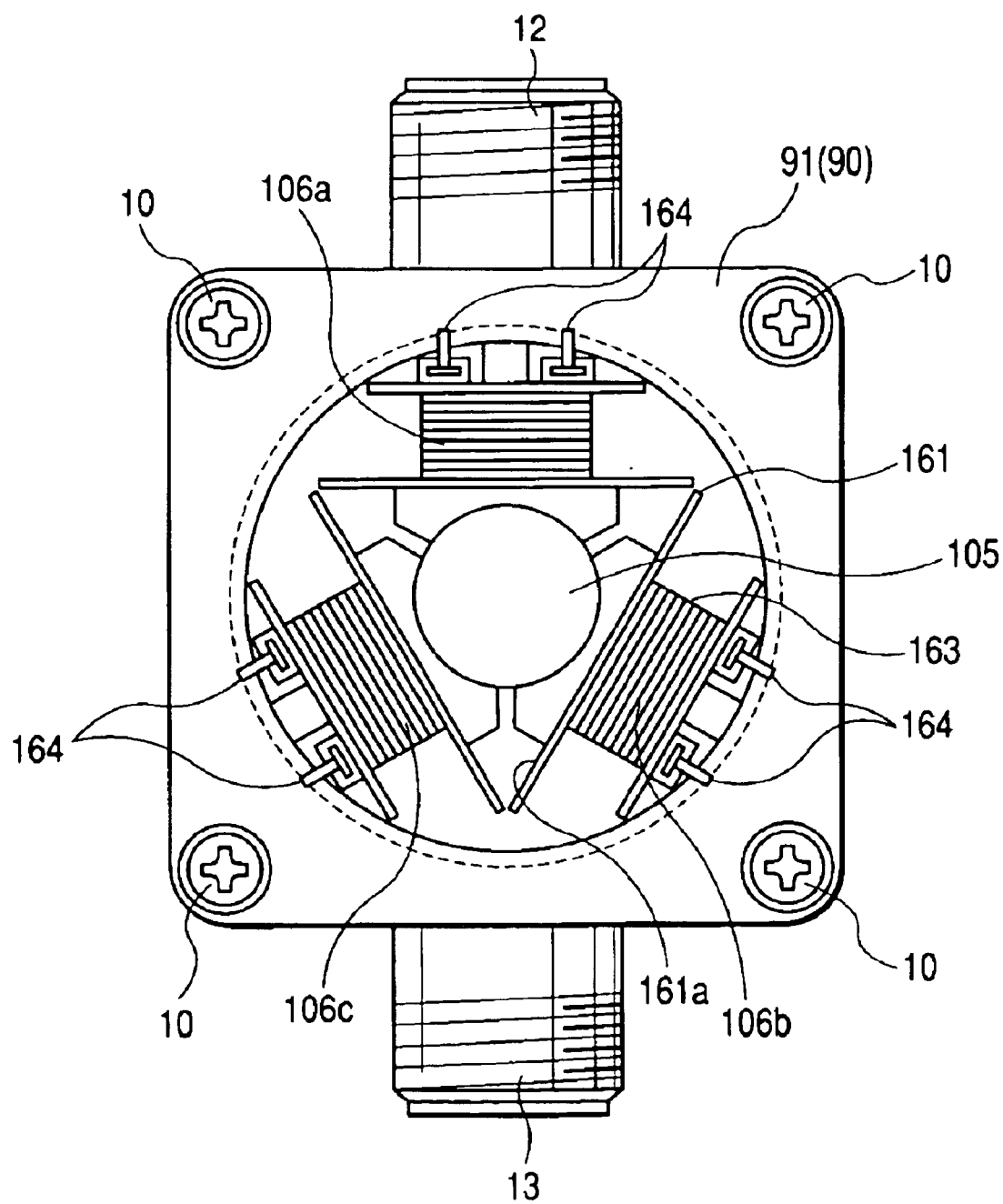
FIG. 6 is a side view showing the small generator of FIG. 5 taken along an arrow VI in FIG. 5.

Next, a small generator utilizing a brushless motor type according to a second embodiment of the invention will be described with reference to FIGS. 5 and 6. In the description of the second embodiment, the description of the same structures as those in the first embodiment will be omitted and the same components have the same reference numerals as those in the first embodiment. FIG. 5 is a longitudinal sectional view showing a small generator according to the second embodiment of the invention. Moreover, FIG. 6 is a side view showing the small generator of FIG. 5 taken along an arrow VI in FIG. 5.

As shown in FIG. 5, the small generator utilizing a brushless motor type according to the second embodiment has almost the same structure as that in the first embodiment, and includes a casing 1, a nozzle ring 2 provided in the casing 1, a hydraulic turbine 3 rotatably provided on the inner peripheral side of the nozzle ring 2, a rotor 4 rotates integrally with the hydraulic turbine 3, a cup-shaped member 105 formed of stainless which is provided on the outer peripheral side of the rotor 4, and a stator portion 106 of a brushless motor which is further provided on the outside of the cup-shaped member 105.

A body portion 111 of the casing 1 has a generation part attaching portion 111a for attaching a generation part constituted by the rotor 4 and the stator portion 106. The generation part attaching portion 111a is constituted by a concave portion 111c having a hole in a central part formed on the right side of the body portion 111 in FIG. 1 and an outer peripheral portion thereof, and a circumferential groove 111b is formed in the outer peripheral portion. An O ring 8 is embedded in the groove 111b.

Furthermore, a flange portion 152 formed in the outermost peripheral portion of the cup-shaped member 105 is pushed to seal the O ring 8 in the groove 111b and a cup-shaped member 90 is provided to interpose the outer peripheral end of the flange portion 152 together with the generation part attaching portion 111a in a state in which the outer peripheral end of the flange portion 152 is caused to abut on a convex portion (which is not shown and has the same structure as that of the first embodiment) formed in the body portion 111. More specifically, the cup-shaped member 105 is pushed against the generation part attaching portion 111a while crushing the O ring 8 in the groove 111b, and furthermore, the cup-shaped member 90 is provided from above. As shown in FIG. 6, four screws 10 are inserted in screw holes formed on four corners of the cup-shaped member 90 for screwing so that the cup-shaped member 90 is fixed to the body portion 111 of the casing 1. Consequently, the generation part attaching portion 111a to be the open end face of the casing 1 is closed by the cup-shaped member 105.

The cup-shaped member 105 is formed of a non-magnetic stainless member, and is provided with the flange portion 152 through throttling, an outer cylindrical portion 155 connected to the flange portion 152, an inner cylindrical portion 151 provided on the inside of the outer cylindrical portion, a coupled surface potion 156 coupling both cylindrical portions 151 and 155, and a bottom portion 153. The cup-shaped member 105 thus constituted is fitted in the concave portion 111c of the generation part attaching portion 111a and is interposed and fixed between the casing 1 and the cup-shaped member 90 as described above. A bearing 15 for rotatably receiving one of ends of a shaft 7 supporting the hydraulic turbine 3 and the rotor 4 is fitted in the bottom portion 153. The cup-shaped member 105 serves to separate the stator portion 106 of the brushless motor from a fluid passing through the inside of the casing 1 and to prevent the fluid from flowing out of the casing 1.

The nozzle ring 2 is press-fitted in the coupling path 14 of the casing 1 in such a manner that the nozzle ring 2 acts to an injecting member serving as a part of the fluid path of the Water Tap apparatus and effecting to throttle the flow of the passing fluid and to inject the fluid to a blade portion 31 of the hydraulic turbine 3. The structure of the nozzle ring 2 is the same as that of the first embodiment. Moreover, the structures of the hydraulic turbine 3 provided on the inside of the nozzle ring 2 and the rotor 4 formed integrally with the hydraulic turbine 3 are also the same as those of the first embodiment.

The rotor 4 serves as the rotor portion of the brushless motor in such a manner that the rotor 4 coupled to the hydraulic turbine 3 rotates together with the hydraulic turbine 3, and is constituted by a rotor magnet Mg having two poles magnetized onto an outer peripheral surface thereof. The outer peripheral surface is opposed to the stator portion 106 of the brushless motor through the inner cylindrical portion 151 of the cup-shaped member 105. For this reason, in the case where the rotor 4 rotates together with the hydraulic turbine 3, it rotates relatively with respect to the stator portion 106.

The stator portion 6 is constituted by three coil portions 106a, 106b and 106c provided at regular intervals in a circumferential direction as shown in FIG. 6. Each of the coil portions 106a, 106b and 106c includes a stator core 161 and a coil 163 wound onto the stator core 161. Start and end portions for winding the coil 163 are connected to a terminal 164, respectively.

The stator portion 106 thus constituted is fitted in a portion between the inner cylindrical portion 151 of the cup-shaped member 105 and the outer cylindrical portion 155. For this reason, a magnetic flux flows between an inner opposed surface 161a of each yoke member 161 to be a pole of the stator portion 106 and the magnetized portion of the rotor 4. As described above, when the rotor 4 rotates together with the hydraulic turbine 3, the flow of the magnetic flux is changed so that an induced voltage is generated on the coil 163 in such a direction as to prevent the change in the flow. The induced voltage is taken out of the terminal 164.

The induced voltage taken out in such a form is converted into a direct current through a circuit. An AC voltage induced by the generation part having an output coil to be a three-phase Y connection is rectified through a three-phase bridge circuit (not shown) having six diodes and one smoothing capacitor and is converted into a direct current to be charged into a battery.

The stator portion 106 is constituted by the three coil portions 106a, 106b and 106c as described above and has three poles. On the other hand, the rotor 4 opposed to the stator portion 6 is two-pole magnetized as described above. More specifically, in the embodiment, the brushless motor type is used and the number of poles magnetized onto the rotor (rotor portion) 4 and the number of coil portions (the number of poles) of the stator portion 106 have a relationship of 2-3. For this reason, a detent torque generated between the stator portion 106 and the stator 4 is not so great as that in the conventional single layer stepping motor type. Consequently, the detent torque between the rotor 4 and the stator portion 106 which is generated during the rotation of the hydraulic turbine 3 does not act as a very great brake and the hydraulic turbine 3 can rotate smoothly with a small flow at a low hydraulic pressure together with the rotor 4.

The relationship between the number of poles magnetized onto the rotor (rotor portion) 4 and the number of coil portions (the number of poles) of the stator portion 106 may be 4-3 or 4-6 in place of 2-3 in the embodiment, for example. Also in the second embodiment in which the main part of the generator is thus constituted by the brushless motor type, the hydraulic turbine 3 can rotate by utilizing a fluid flowing into an inlet path 12 with 2.0 to 3.0 liters/minute in the same manner as in the first embodiment.

If the structure of the generator has a stepping motor type and the stator portion has a single layer structure (the stator portion has the two-layer structure in the first embodiment), the detent torque is great and acts as a brake as described above. More specifically, the hydraulic turbine 3 can rotate with a flow of 3 liters/minute or more. As described above, it is possible to generate a power in a small amount of water by causing the structure of the main part of the generator to have the brushless motor type.

The small generator according to each of the embodiments can generate a power by utilizing a small flow of 2.0 to 3.0 liters/minute. In addition, also in the case in which the flow is more than 3.0 liters/minute, it is a matter of course that the power can be generated. In addition, the rotor 4 rotates smoothly without an influence of the detent torque. Therefore, a generation output per rotation speed is higher than that in the conventional art.

There are such effects. In a Water Tap apparatus having the small generator according to each of the embodiments attached thereto, therefore, a valve opening degree is controlled to include at least two mode specifications such as a water saving mode in which a flow of the fluid to flow to the fluid path is set to be smaller than usual and a normal mode in which the flow is normal, and the flow in the water saving mode may be set to 2.0 to 3.0 liters/minute as described above. Thus, the power can be generated in the water saving mode and the generation output having a high efficiency can be obtained in the normal mode.

In each of the embodiments, as described above, it is possible to more reduce the detent torque than that in the conventional stepping motor type having a single layer structure. Therefore, a hole diameter of the nozzle 23 may be increased to reduce a hydraulic pressure to be applied to the hydraulic turbine 3, for example, and it is also possible to further reduce a possibility that the nozzle ring 2 and the hydraulic turbine 3 might be broken due to the hydraulic pressure. In that case, the lowest flow with which the hydraulic turbine 3 can rotate is slightly raised corresponding to the increase in the hole diameter of the nozzle 23 and the reduction in the hydraulic pressure. If the flow is approximately 2.5 liters/minute, for example, much higher performance can be obtained as compared with that in the conventional art.

Next, a water tap apparatus employing the small generator of the present invention described above will be described below more in detail.

FIGS. 7(a) and (b) show sectional views of the water tap apparatus containing the small generator of the present invention. FIG. 8 is a block diagram of relationship among a small generator, a capacitor and a controller.

In FIGS. 7(a) and (b), a water tap 1000 contains a spout and a human body detecting sensor 1001 for detecting a hand. The following parts are provided in the water tap 1000, that is, a solenoid valve 1002 opens and closes water flow, a small generator 1005 is shown in FIG. 1 or 5, a controller 1003 for controlling the opening/closing of the solenoid valve 1002 includes a DC converter (not shown) for converting an induced voltage to a direct current and a rectifier circuit for rectifying the direct current, and a capacitor 1004 storages a rectified current.

Next, the water tap 1000 operation will be described hereinbelow. When a human hand is detected by the sensor 1001, a signal send from the sensor 1001 to the controller 1003. The controller 1003 outputs the open signal to the solenoid valve 1002. Then, the solenoid valve open to spout a water. The water flows in the tube located in the water tap to reach the small generator 1005. In the small generator 1005, the water entering into the inlet path is throttled by the nozzle or the like to increase the hydraulic pressure. Then water hits on the blade portion of the hydraulic turbine to generate an induced voltage. The induced voltage is converted to the direct current by the DC converter (not shown) and rectified by passing through the rectifier circuit (not shown) to storage the capacitor (not shown).

Then, the current storaged in the capacitor (not shown) is applied to the controller 1002.

On the other hand, when the human hand is not detected, the sensor 1001 recognizes the condition to output a signal to the controller 1002 to close the solenoid valve 1003.

The water tap 1000 operation is not limited by this embodiment described above. The following operation could be employed such that after spouting a predetermined amount of the water, the water flow is automatically stopped.

In the small generator according to the invention, the rotor coupled to the hydraulic turbine which rotates through the passage of the fluid acts as the rotor portion opposed to the stator portion having multiple layers in the stepping motor including the stator portion. Therefore, each layer acts to cancel a detent torque between the stator portion and the rotor so that the detent torque can be reduced. As a result, the hydraulic turbine can rotate with a low flow at a low hydraulic pressure.

In the small generator according to another invention, moreover, the rotor coupled to the hydraulic turbine which rotates through the passage of the fluid serves as the rotor portion opposed to the stator portion of the brushless motor including the stator portion having a plurality of coil portions. Consequently, it is possible to reduce the detent torque. As a result, it is possible to rotate the hydraulic turbine with a small flow at a low hydraulic pressure.

Furthermore, the Water Tap apparatus according to the invention has at least two modes of a water saving mode and a normal mode by controlling the valve opening degree, and is provided with the small generator in the fluid path. In the Water Tap apparatus according to the invention, thus, the small generator having a detent torque reduced is provided in the fluid path so that the power can be generated with a small flow at a low hydraulic pressure. Consequently, if the hydraulic pressure of the fluid to be supplied to the hydraulic turbine is set to be low, it is possible to reduce a possibility that a member might be damaged at a high hydraulic pressure in the normal mode and a power can fully be generated also in the water saving mode.

What is claimed is:

1. A small generator comprising:
    a hydraulic turbine, provided in a fluid path, rotating by passing a fluid in a predetermined flow rate;
    a rotator, coupled to the hydraulic turbine, rotating together with the hydraulic turbine, the rotator acting as a rotor portion opposed to a stator portion having multiple layers in a stepping motor including the stator portion,
    wherein the rotor portion rotates relatively with respect to the stator portion by with passing the fluid to generate a power.

2. The small generator according to claim 1, wherein a detent torque generated between the stator portion and the rotor is set to be canceled by arranging the layers each other.

3. A small generator comprising:
    a hydraulic turbine, provided in a fluid path, rotating by passing a fluid in a predetermined flow rate;
    a rotator, coupled to the hydraulic turbine, rotating together with the hydraulic turbine, the rotator acting as a rotor portion opposed to a stator portion having a plurality of coil portions in a brushless motor including the stator portion,
    wherein the rotor portion relatively rotates with respect to the stator portion by passing the fluid to generate a power.

4. The small generator according to claim 3, wherein a relationship between the number of poles magnetized onto the rotor portion and the number of coil portions of the stator portion is set to one of 2-3, 4-3 and 4-6.

5. The small generator according to claim 1, further comprising:
    an injecting member including an injecting hole acting as a part of the fluid path and serving to throttle a flow for a passage to inject a fluid onto a blade portion of the hydraulic turbine.

6. A Water Tap apparatus comprising:
    a valve opening degree controlled to include at least two modes of a water saving mode in which a flow of a fluid to flow to a fluid path and a normal mode for a normal and
    a small generator according to claim 1 arranged on the fluid.

7. The Water Tap apparatus according to claim 6, wherein the flow in the water saving mode is set to 2.0 liters/minute to 3.0 liters/minute.

8. The small generator according to claim 3, further comprising:
    an injecting member including an injecting hole acting as a part of the fluid path and serving to throttle a flow for a passage to inject a fluid onto a blade portion of the hydraulic turbine.

9. A Water Tap apparatus comprising:
    a valve opening degree is controlled to include at least two modes of a water saving mode in which a flow of a fluid to flow to a fluid path and a normal mode for a normal flow; and
    a small generator according to claim 3 arranged on the fluid.

10. The Water Tap apparatus according to claim 9, wherein the flow in the water saving mode is set to 2.0 to 3.0 liter/minute.

* * * * *